May 26, 1942.  C. H. SCHLESMAN  2,284,345
METHOD AND APPARATUS FOR GEOPHYSICAL PROSPECTING
Filed Oct. 21, 1941  3 Sheets-Sheet 1

Inventor
Carleton H. Schlesman
By Myron J. Burkhard
Attorney

May 26, 1942.                C. H. SCHLESMAN                2,284,345
         METHOD AND APPARATUS FOR GEOPHYSICAL PROSPECTING
                    Filed Oct. 21, 1941         3 Sheets-Sheet 2
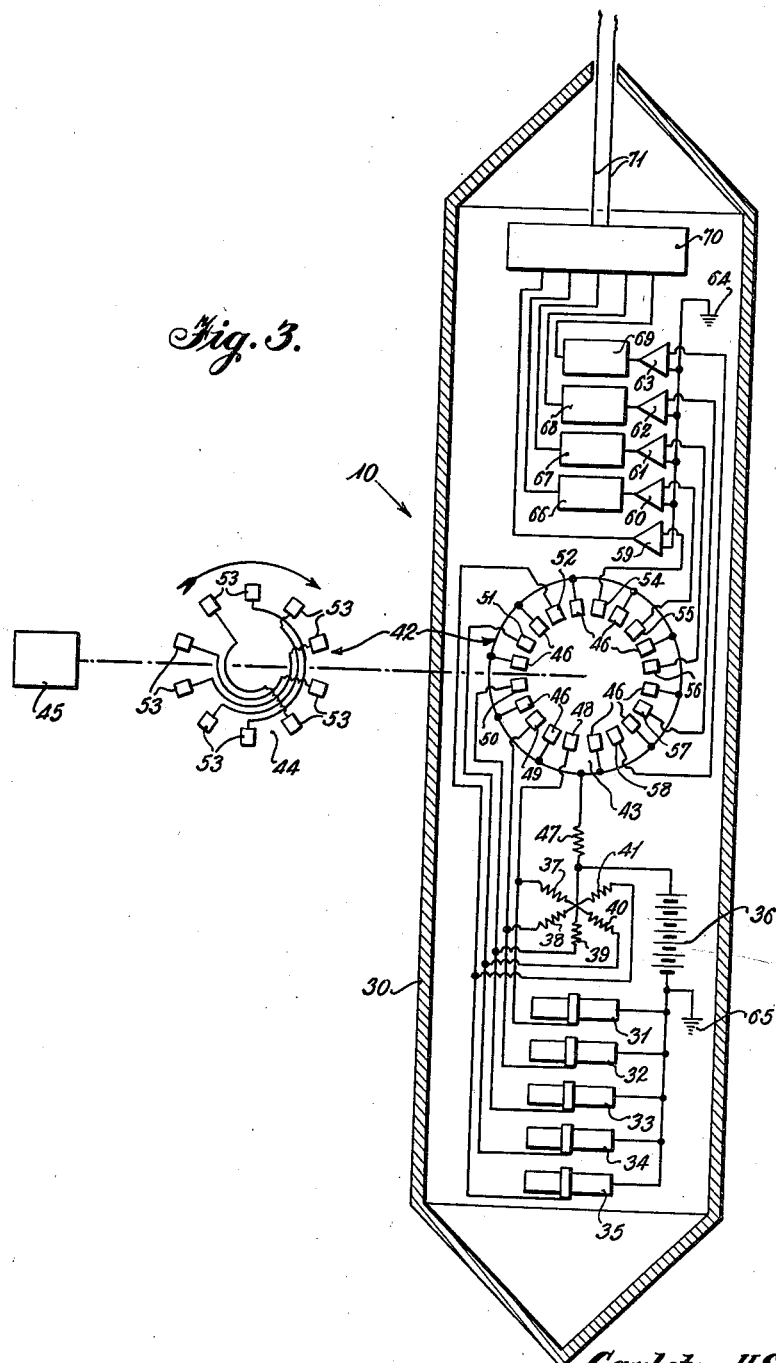
Inventor
Carleton H. Schlesman
By
Attorney May 26, 1942.  C. H. SCHLESMAN  2,284,345
METHOD AND APPARATUS FOR GEOPHYSICAL PROSPECTING
Filed Oct. 21, 1941  3 Sheets-Sheet 3

Inventor
Carleton H. Schlesman
By
Myron J. Burkhard
Attorney

Patented May 26, 1942

2,284,345

UNITED STATES PATENT OFFICE 2,284,345

METHOD AND APPARATUS FOR GEOPHYSICAL PROSPECTING

Carleton H. Schlesman, Camden, N. J., assignor to Socony-Vacuum Oil Company, Incorporated, New York, N. Y., a corporation of New York Application October 21, 1941, Serial No. 415,976

15 Claims. (Cl. 250—83.6)

This invention relates in a general sense to methods of geophysical prospecting whereby characteristics of geological formations traversed by a well bore or similar earth opening can be accurately determined. More particularly regarded, the invention includes a novel geophysical prospecting method especially suited for distinguishing between adjoining subterranean strata, detecting thin rock layers and for locating strata interfaces.

In accordance with certain present day well logging techniques, data concerning subsurface geological formations is obtained by placing a radiation-sensitive detector within the well bore or other earth opening under investigation and measuring, at different locations, the intensity or character of natural or artificially induced radiation. By comparison of the measurements, either with each other or with reference to empirical standards obtained in prior or different explorations, the location and geological character of subterranean formations can be determined with acceptable accuracy. By this practice, the well log thus obtained, particularly if complemented by logs of other wells nearby in the same field, permits a skilled geologist or prospector to predict the presence and location of productive horizons or to determine with reasonable accuracy the probable non-productivity of the locality under investigation.

In conducting surveys of this nature, it has heretofore been customary to use as a radiation detector an ionization chamber comprising electrodes as hereinafter described, cased in an envelope or capsule capable of being inserted and freely moved within the well bore. In this type of apparatus, current flows between the electrodes in the chamber when radiation, especially when of short wave length such as gamma rays, enters the dielectric between the electrodes causing ionization of same. The current flow thus produced can be amplified and transmitted to surface equipment where its magnitude can be measured and recorded as an index of the character of the formations being studied.

Early workers in this field of radiation prospecting employed ionization chambers of the Geiger-Müller type comprising differentially charged electrodes in a gas-filled partially evacuated envelope, the potential applied to the electrodes being of threshold magnitude whereby a current flow would occur only when radiation entered the chamber causing ionization of the rarified gaseous medium between the electrodes. Because of its intermittent operation, as current does not flow continually between the electrodes, devices of this type serve as mere counters of more intense radiation and do not permit measurements of less intense radiation of the magnitude frequently encountered in geophysical prospecting operations which would be insufficient to ionize the medium, hence a more suitable device possessed of the requisite sensitivity was sought by workers in this field.

This need was in a large measure satisfied by a later development that involved use of a high pressure type of ionization chamber in measuring subterranean radiation. In this instance, the differentially charged electrodes are separated, not by a rarified gaseous dielectric as in the Geiger-Müller counter, but by an inert gas such as argon or nitrogen under superatmospheric pressure, and the electrode potential is adjusted to a value such as to permit a continuous current flow, varying in magnitude proportionally to the intensity of radiation entering the chamber. In addition to being more sensitive than the Geiger-Müller device because the denser dielectric makes ionization by radiation occur more readily, this type of ionization chamber possesses the further advantage of providing a continuous current flow in the chamber which can be easily amplified for transmission to surface equipment for direct magnitude measurement.

While thus excellently suited for geophysical prospecting operations because of its increased sensitivity to radiation of low intensity, however, high pressure ionization chambers of the type now used are not wholly satisfactory because they do not permit of sufficiently delicate distinction between adjoining strata essential to the accurate location of strata interfaces and thin rock layers. This is due in large degree to the size of the chamber which, as a practical matter, is often made three or four feet long to provide a large electrode surface and volume of dielectric, thereby increasing the zone within which radiation may affect the instrument and the magnitude of the current flow. Short chambers with smaller electrode surface and less dielectric volume would permit better distinction between strata at interfaces but are less sensitive to radiation chiefly because of the small current flow involved and hence have not heretofore been found satisfactory for this purpose. A further disadvantage of short chambers is that due to their comparative insensitivity to radiation their use would excessively delay logging operations by necessitating very slow movement of the instrument within the well bore.

In accordance with the present invention, it is now possible to locate strata interfaces and thin rock layers accurately by use of short ionization chambers of the type mentioned while preserving the desired sensitivity of the instrument to low intensity radiation, thereby obviating the necessity of slow movement of the instrument within the well bore as above referred to. This is accomplished by using a series of the short ionization chambers which, when in the well bore, are arranged in vertically superposed relationship, and accumulating the currents flowing through the several chambers as they successively pass a selected point to provide an index of radiation intensity at that point. Inasmuch as the time at which each of the chambers is adjacent a selected point is determined by both the depth of the chambers and the rate of movement of the instrument in the well bore, the means for accumulating the several currents is correlated with the rate of motion of the instrument.

Regarded in its structural aspects, the geophysical prospecting instrument according to the present invention comprises a capsule or envelope, capable of being inserted in a well bore and adapted to exclude well fluids, within which are mounted a plurality of shallow ionization chambers which, when the instrument is within a well bore, are disposed in vertically superposed relationship, and means for accumulating currents from each of the chambers successively as each passes a reference point during movement of the instrument, whereby the total magnitude of the currents thus accumulated provides an index of radiation intensity at the reference point. In pursuance of the invention, the accumulation of the several currents can be performed by mechanical or electrical delay devices associated with appropriate electrical circuits and correlated in their operation with the rate of instrument movement within the well bore. The device functions, in effect, as if a single shallow chamber having the total electrode area and dielectric volume of all the chambers in the series, were used, thereby permitting delicate demarcation of strata interfaces and also providing a signal current of the desired magnitude.

To facilitate a better understanding of the present invention a specific embodiment thereof illustrated in the accompanying drawings will be hereinafter described, but it is clearly to be understood that this embodiment is supplied by way of example, not by way of limitation, of this invention, except insofar as the scope thereof is indicated in the subjoined claims.

Referring to the drawings:

Figure 3 is essentially a diagrammatic illustration of the mechanism of a prospecting instrument according to this invention.

Figure 1:
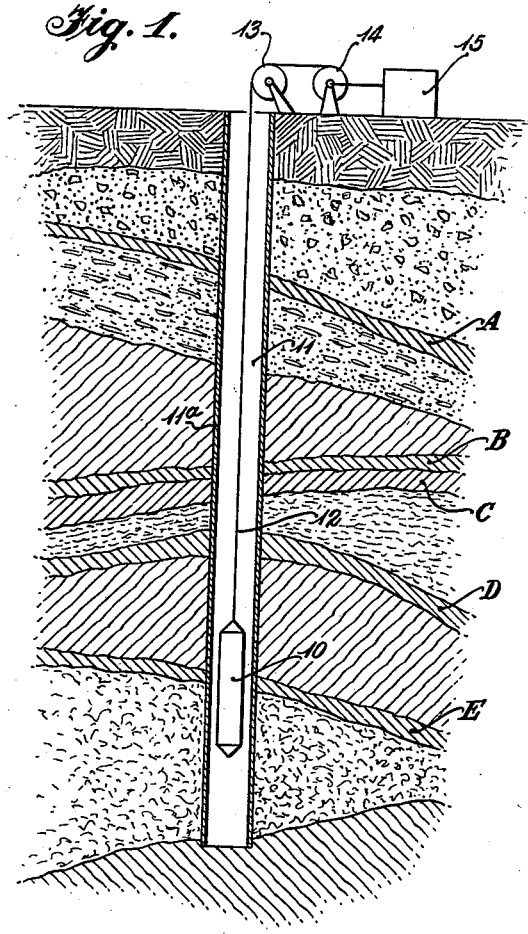
Figure 1 is essentially a vertical sectional view of a well bore, illustrating a prospecting instrument therein in accordance with this invention.

In performing geophysical prospecting operations in pursuance of the present invention a prospecting instrument 10 is suspended within a well bore 11 upon a cable 12 which passes over a measuring wheel 13 to a winch 14 that serves to control movement of the instrument within the well bore. Although the well bore 11 is illustrated with a casing 11a positioned therein, it is to be understood that from the standpoint of this invention an uncased bore can be explored with equal facility. Electrical connection is provided between the instrument 10 and surface recording or indicating equipment 15, either by electrical connections through the cable 12 or by use of other methods for transmitting signals from the prospecting instrument to the indicating or recording mechanism, such as by use of radiation transmitting and detecting equipment.

Figure 2:
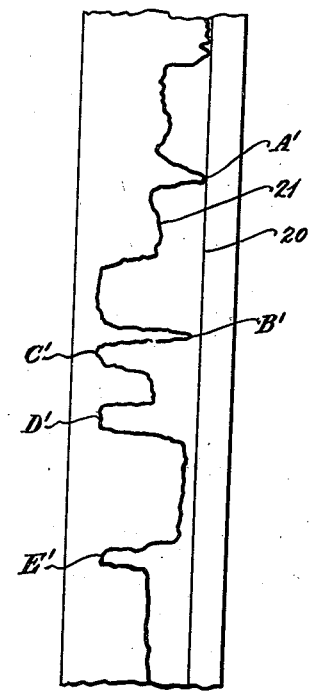
Figure 2 illustrates a fragment of a typical well log obtained by practice of this invention.

The measuring wheel 13 is coupled through a mechanical or electrical, such as Selsyn, power transmission with the recording or indicating equipment 15, whereby the signals originating in the prospecting instrument 10 are recorded or indicated in correlation with indications of movement of the instrument within the well bore. There is thus provided a well log of the type illustrated in Figure 2, wherein a norm line 20, measured from a reference point, indicates the position of the prospecting instrument within the well bore and a trace 21, fluctuating relative to norm line 20, indicates the changing magnitude of signals received from the prospecting instrument. The degree of deviation of the trace from the norm line serves as an indication of the character of surrounding geological formations at the corresponding depth within the well bore.

It will be observed, referring to Figure 1, that the strata A, B, C, D and E are relatively thin as compared with other strata through which the bore passes and that these strata appear in the trace 21 as the peaks or troughs A', B', C', D' and E' respectively at corresponding depths. As has been above mentioned, thin strata of this nature would not be satisfactorily detected by geophysical prospecting equipment of the type heretofore used, but are readily detected by use of the equipment according to this invention. The apparatus by which this desired result is achieved will now be described.

In general the prospecting instrument according to this invention comprises a multiplicity of vertically superposed shallow ionization chambers mounted within a capsule capable of being inserted within a well bore, the chambers being connected to a suitable power supply and an accumulating apparatus whereby potentials arising in said chambers due to radiation from a selected adjacent reference point are correlated as the chambers successively pass the point to provide a single signal indicative of the radiation intensity at that point.

Referring to Figure 3, it will be observed that the prospecting device, generally designated by the reference character 10, comprises a casing 30 shaped in the form of a capsule, adapted to protect the equipment mounted therein from mechanical shocks and from fluids present within the well bore. Within the capsule are mounted a series of shallow ionization chambers 31, 32, 33, 34 and 35, arranged whereby the chambers are vertically superposed when the capsule is positioned within a well bore. A continuous current flow from a battery or equivalent current source 36 passes through each of the chambers 31, 32, 33, 34 and 35, which are individually connected in series therewith through resistances 37, 38, 39, 40 and 41 respectively.

Each of the ionization chambers above mentioned includes a pair of spaced electrodes, differentially electrically charged by the current source 36 as indicated, positioned within an electrically conductive medium affected by ionization, particularly by high frequency radiation such as gamma rays. When the radiation enters a chamber the conductive medium between the electrodes, which preferably is an inert gas, such as argon or nitrogen under superatmospheric pressure, becomes an improved conductor of electricity and accordingly the current normally flowing through the chamber is increased to a degree proportional to the intensity of the radiation.

As the capsule is moved within the well bore, radiation from adjoining strata enters successively each of the chambers, first entering the chamber 35 and thereafter the chambers 34, 33, 32 and 31 in this sequence when the device is lowered within the bore, thereby causing corresponding successive changes in the currents flowing in each of the several chambers. A rotary transducer 42 comprising a stator 43 and a rotor 44, continuously rotated at a uniform speed by a motor 45, is mounted within the capsule 30. The transducer is of the type having diametrically opposed plates of the rotor electrically connected. Alternate plates 46 of the stator 43 are connected with each other and through a resistance 47 to the current source 36 above mentioned. Plates 48, 49, 50, 51 and 52 of the transducer stator are connected to the chambers 31, 32, 33, 34 and 35 respectively. When the ionization chambers are at equilibrium potential, that is, when radiation does not enter any chamber, each of the plates 46, 48, 49, 50, 51 and 52 is at the same potential. When, however, radiation enters any one of the chambers the corresponding condenser plate 48, 49, 50, 51 or 52 becomes surcharged with an equivalent excess potential.

Inasmuch as the rotor of the transducer is provided with diametrically connected plates 53, as mentioned, the potential of the plates 48, 49, 50, 51 and 52 is reflected in the potential charge of the oppositely positioned stator plates 54, 55, 56, 57 and 58 respectively. These plates 54, 55, 56, 57 and 58 are connected to the input terminals of amplifiers 59, 60, 61, 62 and 63 respectively, the other input terminal of each of the amplifiers being connected to the current source 36 through a ground circuit 64—65. It will be apparent from the foregoing that the current supplied to each of the amplifiers 59, 60, 61, 62 and 63 is proportionally related to the currents flowing in the corresponding ionization chambers 31, 32, 33, 34 and 35. Due to rotation of the rotor 44 of the transducer 42, however, the currents supplied to the amplifiers are alternating currents of magnitude proportional to the direct currents flowing in the ionization chambers, the frequency of the alternating currents thus supplied being controlled and maintained constant by adjustment of the speed of the motor 45.

The amplifiers 60, 61, 62 and 63 are connected to transmit their output currents to delay devices 66, 67, 68 and 69 respectively, hereinafter described, from which devices the currents pass to a mixer circuit 70 from which they are transmitted as a single composite current through the lines 71 to the indicating or recording equipment 15 located at the surface. The delay devices 66, 67, 68 and 69 are adjusted whereby signal currents corresponding to radiation measurements performed by the ionization chambers 32, 33, 34 and 35 arrive simultaneously and in phase with the signal current arising from the ionization chamber 31, which, being the last to pass a given reference point upon downward motion of the capsule within the well bore, is provided with no delay device. For example, if the five chambers of the prospecting instrument pass a reference point in 1.6 seconds the delay device 66 is adjusted for a .4 second delay, device 67 for a .8 second delay, device 68 for a 1.2 second delay, and device 69 for a delay of the full period, namely 1.6 seconds. In this manner the signals from the several ionization chambers reach the mixer circuit 70 simultaneously. It will be apparent that correlation between movement of the instrument within the well bore and adjustment of the delay devices is essential.

Figure 4:
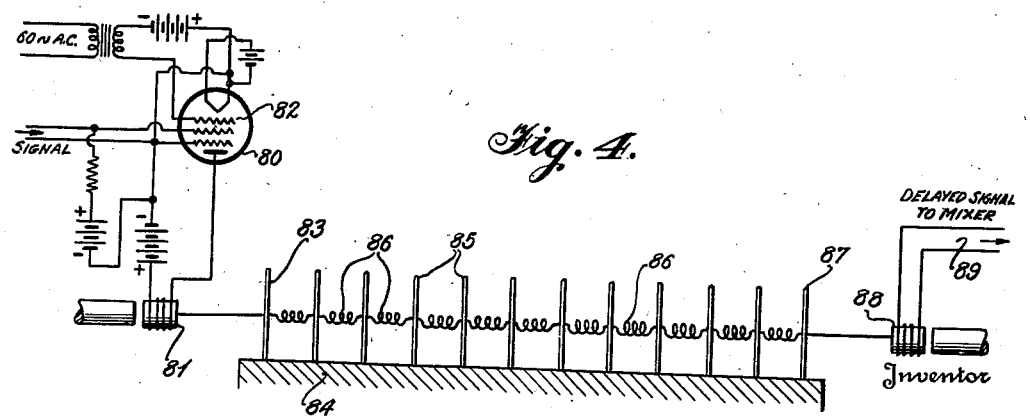
Figure 4 is substantially a diagrammatic illustration of a delay mechanism forming a part of the device illustrated in Figure 3.

The delay devices employed can be conventional electrical filter networks for short delay periods, or for longer delays, a mechanical acoustical system, such as is illustrated in Figure 4 of the drawings, can be used. In this mechanical acoustical system the output signal derived from one of the amplifiers is passed to grid elements of a pentode tube 80 which operates a dynamic driver element 81. A 60-cycle continuous carrier vibration is imparted to the driver unit by a current of standard frequency applied to a control grid 82 of said tube whereby the signal from the amplifier is superposed upon the current of standard frequency. The dynamic driver 81 is mechanically coupled to a reed 83, mounted upon a base plate 84 and coupled with a series of other reeds, some of which are indicated by the reference character 85, the coupling preferably being by multiple springs 86. The reeds are tuned to a frequency of 60 cycles and oscillated at the same frequency by the driver, thus at the final reed 87 the component of vibration due to the signal current applied to the control grids of pentode 80 appears after a predetermined time interval subsequent to the application of the signal current to the tube 80 and its conversion to a vibration component applied through the driver 81 to the reed 83. The time interval required for the signal component to pass through the delay system varies with the number of reeds employed and with the mode of coupling the reeds with each other. This delay mechanism is of particular value in the practice of the present invention because it permits the interposition of a volume control device in the circuit of the vacuum tube 80 whereby the magnitude of the signal transmitted to the mixer can be altered without consuming the useful currents in the mixer circuit. Another method of controlling indirectly the volume of the signal current supplied to the mixer circuit by a device of this type is to vary the effective amplification ratio of the vacuum tube 80 in the conventional manner. The final reed 87 is connected to a dynamic transmitter unit 88 which causes currents to appear in the lines 89 related in magnitude to the signal currents applied to the pentode 80 but out of phase therewith.

Figure 5:
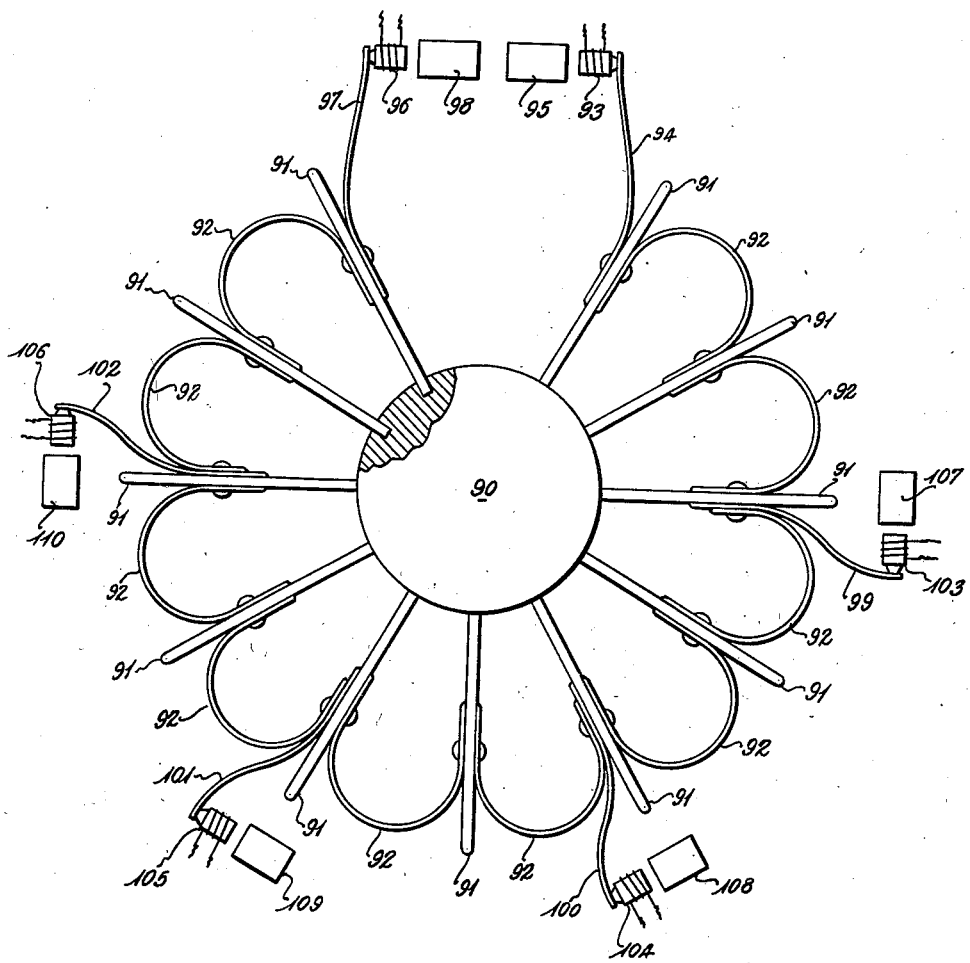
Figure 5 is substantially a top plan view of a compound mechanical-acoustical delay mechanism which can form a part of the device illustrated in Figure 3.

The compound delay device shown diagrammatically in Figure 5 can be used in the device illustrated in Figure 3 to replace the mechanical-acoustical system of Figure 4 described above. In this form of delay device, an anchor block 90, carrying a series of radially extending circumferentially spaced reeds 91, is provided, the reeds being coupled with each other by intrinsically resilient bows 92, each rigidly attached to a pair of reeds in a manner such that vibrations imparted to one of the reeds are communicated successively and after corresponding delays to each other reed in the series. A driving signal applied to the reed system is transmitted to the device through a driving coil 93 which is mounted on one of the reeds 91 by a supporting member 94. A magnet 95 cooperates with the driving coil whereby currents passing through the coil cause the coil to be attracted or repelled by the magnet. The vibrations are communicated through the supporting member 94 to the first of the reeds 91 from which, as mentioned, the vibration in turn is transmitted to the other reeds through the bows 92. A transmitter coil 96, mounted upon a supporting member 97 that in turn is attached to the final reed of the series, cooperates with an adjacent magnet 98 whereby a current is induced in the coil as the coil is moved relative to the magnet by the vibrating reeds. The time interval elapsing between initiation of reed vibration by the drive coil 93 and movement of the transmitter coil 96 can be readily determined by those versed in this art upon consideration of the physical characteristics of the structural components used.

A series of supporting members 99, 100, 101 and 102, mounted upon intermediate reed elements 91, carry driving coils 103, 104, 105 and 106 respectively, which cooperate with adjacent magnets 107, 108, 109 and 110 respectively, in a manner analogous to the operation of the drive coil 93 above described. These intermediate driving coils are connected with the ionization chambers of the detecting device whereby the signal from the chamber requiring maximum delay is transmitted to the drive coil 93, the signal from the next chamber to the drive coil 103, from the third chamber to the drive coil 104, and in like manner from the other chambers to the drive coils 105 and 106, the delay in each instance diminishing proportionally to the proximity of the drive coil to the last reed in the series. By use of this delay device the mixer unit can be eliminated as the signal obtained from the transmitter coil 96 constitutes a composite signal derived from the component signals obtained from each of the drive coils.

It is to be understood by those skilled in this art that other delay circuits or mechanical delay devices can be adapted for use in the practice of this invention and likewise that conventional electrostatic voltmeters can replace the rotary transducer and associated apparatus hereinabove described.

It also will be understood that in the event the device is to be used for prospecting purposes while being raised within the well bore, instead of during lowering operations as above described, suitable reversing mechanism can be employed to interchange the delay net work connections and the connections to the successive ionization chambers.

Having thus described the present invention, what it is desired to secure by Letters Patent of the United States is:

1. A geophysical prospecting apparatus comprising a plurality of closely adjacent coaxially arranged radiation detectors, means for accumulating detections from said detectors in sequence, and at a predetermined rate, means for indicating the accumulated detections as an index of the character of geophysical formations in the vicinity of the apparatus, and correlating the delay interposed in the signals of the detectors with the rate at which the detectors are moved past a point of reference.

2. A geophysical prospecting apparatus comprising a plurality of supported vertically superposed radiation detectors, means for accumulating detections from said detectors in sequence and at a predetermined rate, means for indicating the accumulated detections as an index of the character of geophysical formations in the vicinity of the apparatus, and correlating the delay interposed in the signals of the detectors with the rate at which the detectors are moved past a point of reference.

3. A geophysical prospecting apparatus comprising a plurality of supported vertically superposed relatively shallow radiation detectors, means for moving said detectors as a unit past a reference point, means for accumulating detections from said detectors in sequence and at a predetermined rate related to their motion past the reference point, and means for indicating the accumulated detections as an index of the character of geophysical formations in the vicinity of the apparatus.

4. A geophysical prospecting apparatus comprising a plurality of supported vertically superposed relatively shallow radiation detectors, means for moving said detectors as a unit past a reference point, means for accumulating detections from said detectors in sequence and at a predetermined rate related to their motion past the reference point, and means for indicating the accumulated detections as an index of the character of geophysical formations in the vicinity of the apparatus correlated with indications of movement of the detectors.

5. A geophysical prospecting apparatus comprising a plurality of supported vertically superposed shallow high pressure type ionization chambers, means for moving the chambers as a unit past a reference point, means for accumulating currents from said chambers in sequence and at a predetermined rate related proportionally to the rate of movement of the chambers, and means for indicating the accumulated currents as an index of the character of geophysical formations in the vicinity of the apparatus.

6. Apparatus for geophysical prospecting that comprises casing capable of being inserted in a well bore; a plurality of superposed relatively shallow ionization chambers arranged within the casing in a manner such that when the casing is positioned within the well the chambers are vertically superposed; means for causing a continuous current flow through each of the chambers, proportionally related to the intensity of radiation in the vicinity of the corresponding chamber; means for moving the casing within a well bore; means, correlated with movement of the casing in the well bore, for accumulating currents passing through the chambers in sequence as the chambers pass a reference point; and means for indicating the accumulated currents as an index of radiation intensity in the vicinity of the reference point.

7. Apparatus for geophysical prospecting that comprises casing capable of being inserted in a well bore; a plurality of superposed relatively shallow ionization chambers arranged within the casing in a manner such that when the casing is positioned within the well the chambers are vertically superposed; means for causing a continuous current flow through each of the chambers, proportionately related to the intensity of radiation in the vicinity of the corresponding chamber; means for moving the casing within a well bore; means for measuring movement of the casing within the well bore; means, correlated with movement of the casing in the well bore, for accumulating currents passing through the chambers in sequence as the chambers pass a reference point; and means for indicating the accumulated currents as an index of radiation intensity in the vicinity of the reference point in correlation with the measurements of motion of the casing within the well bore.

8. Apparatus for geophysical prospecting that comprises casing capable of being inserted in a well bore; a plurality of superposed relatively shallow ionization chambers arranged within the casing in a manner such that when the casing is positioned within the well the chambers are vertically superposed; means for causing a continuous direct current flow through each of the chambers, proportionally related to the intensity of radiation in the vicinity of the corresponding chamber; means for creating alternating currents related in magnitude to the said direct currents flowing in the chambers; means for moving the casing within a well bore; means, correlated with movement of the casing in the well bore, for accumulating currents passing through the chambers in sequence as the chambers pass a reference point; and means for indicating the accumulated currents as an index of radiation intensity in the vicinity of the reference point.

9. Apparatus for geophysical prospecting that comprises casing capable of being inserted in a well bore; a plurality of superposed relatively shallow ionization chambers arranged within the casing in a manner such that when the casing is positioned within the well the chambers are vertically superposed; means for causing a continuous direct current flow through each of the chambers, proportionally related to the intensity of radiation in the vicinity of the corresponding chamber; means comprising a rotary transducer for creating alternating currents related in magnitude to the said direct currents flowing in the chambers; means for moving the casing within a well bore; means, correlated with movement of the casing in the well bore, for accumulating currents passing through the chambers in sequence as the chambers pass a reference point; and means for indicating the accumulated currents as an index of radiation intensity in the vicinity of the reference point.

10. Apparatus for geophysical prospecting that comprises a casing capable of being inserted in a well bore; a plurality of superposed relatively shallow high pressure type ionization chambers arranged within the casing in a manner such that when the casing is positioned within the well the chambers are vertically superposed; means for causing a continuous direct current flow through each of the chambers, proportionally related to the intensity of radiation in the vicinity of the corresponding chamber; means comprising an electrical transducer for creating alternating currents related in magnitude to the direct current flowing in the ionization chambers; means for individually amplifying said alternating currents; means for measuring movement of the casing within a well bore; means, correlated with movement of the casing in the well bore, for proportionally delaying the alternating currents in sequence as the chambers pass a reference point whereby the currents arising from radiation having a common origin are in phase; means for mixing the delayed currents to produce a single signal current indicative of radiation intensity; and means for continuously indicating the signal current as an index of radiation intensity in the vicinity of the reference point in correlation with measurements of the movement of the casing.

11. A method of geophysical prospecting that comprises moving a series of closely adjacent coaxially arranged shallow ionization chambers in the vicinity of a geological formation, deriving currents from each of said chambers proportionally related to radiation intensities in the vicinity thereof, delaying currents from certain of said chambers whereby the delayed currents are brought into phase with an undelayed current from one of the chambers, accumulating the delayed and undelayed currents as a current related in magnitude to radiation emanating from a selected reference point adjacent the path of movement of the chambers, and indicating the magnitude of said accumulated current as an index of the character of geological formations at the reference point.

12. Method of geophysical prospecting that comprises moving a series of vertically superposed shallow ionization chambers within a well bore, deriving currents from each of said chambers proportionally related to radiation intensities in the vicinity thereof, delaying currents from certain of said chambers whereby the delayed currents are brought into phase with an undelayed current from one of the chambers, accumulating the delayed and undelayed currents as a current related in magnitude to radiation emanating from a selected reference point adjacent the path of movement of the chambers, and indicating the magnitude of said accumulated current as an index of the character of geological formations at the reference point.

13. Method of geophysical prospecting that comprises moving a series of vertically superposed radiation detectors within a well bore, deriving currents from each of said detectors proportionally related to radiation intensities in the vicinity thereof, delaying currents from certain of said detectors whereby the delayed currents are brought into phase with an undelayed current from one of the detectors, accumulating the delayed and undelayed currents as a current related in magnitude to radiation emanating from a selected reference point adjacent the path of movement of the detectors, and indicating the magnitude of said accumulated current as an index of the character of geological formations at the reference point.

14. Method of geophysical prospecting that comprises moving a series of vertically superposed radiation detectors within a well bore, deriving currents from each of said detectors proportionally related to radiation intensities in the vicinity thereof, delaying currents from certain of said detectors whereby the delayed currents are brought into phase with an undelayed current from one of the detectors, accumulating the delayed and undelayed currents as a current related in magnitude to radiation emanating from a selected reference point adjacent the path of movement of the detectors, obtaining measurements of the position of the instrument during movement within the well bore, and recording the magnitude of said accumulated current in correlation with the measurements of instrument position as an index of the character of geological formations at that position.

15. Method of geophysical prospecting that comprises moving a series of vertically superposed shallow ionization chambers within a well bore, deriving currents from each of said chambers proportionally related to radiation intensities in the vicinity thereof, independently amplifying each of said currents, delaying the amplified currents from certain of said chambers whereby the delayed currents are brought into phase with an amplified undelayed current from one of the chambers, accumulating the delayed and undelayed amplified currents as a single current related in magnitude to radiation emanating from a selected reference point adjacent the path of movement of the chambers, and indicating the magnitude of said accumulated single current as an index of the character of geological formations at the reference point.

CARLETON H. SCHLESMAN.